United States Patent
Kolling et al.

(10) Patent No.: US 9,464,147 B2
(45) Date of Patent: Oct. 11, 2016

(54) PROCESS FOR PREPARING OLEFIN POLYMER BY SLURRY LOOP POLYMERIZATION HAVING HIGH POWDER DENSITY

(71) Applicant: Basell Polyolefine GmbH, Wesseling (DE)

(72) Inventors: Lars Kolling, Mannheim (DE); Shahram Mihan, Bad Soden (DE)

(73) Assignee: Basell Polyolefine GmbH, Wesseling (DE)

(*) Notice: Subject to any disclaimer, the term of this patent is extended or adjusted under 35 U.S.C. 154(b) by 218 days.

(21) Appl. No.: 14/364,977

(22) PCT Filed: Dec. 4, 2012

(86) PCT No.: PCT/EP2012/074303
§ 371 (c)(1),
(2) Date: Jun. 12, 2014

(87) PCT Pub. No.: WO2013/092195
PCT Pub. Date: Jun. 27, 2013

(65) Prior Publication Data
US 2014/0316082 A1    Oct. 23, 2014

Related U.S. Application Data

(60) Provisional application No. 61/577,992, filed on Dec. 20, 2011.

(30) Foreign Application Priority Data

Dec. 20, 2011 (EP) .................................... 11194421

(51) Int. Cl.
| | | |
|---|---|---|
| C08F 110/02 | (2006.01) |
| C08F 2/14 | (2006.01) |
| C08F 4/24 | (2006.01) |
| C08F 10/02 | (2006.01) |
| B01J 19/18 | (2006.01) |

(52) U.S. Cl.
CPC ................. *C08F 110/02* (2013.01); *C08F 2/14* (2013.01); *C08F 10/02* (2013.01)

(58) Field of Classification Search
CPC .......... C08F 2/14; C08F 4/24; C08F 110/02; C08F 2500/24
USPC .......................................... 526/64, 106, 908
See application file for complete search history.

(56) References Cited

U.S. PATENT DOCUMENTS

| | | |
|---|---|---|
| 5,198,400 A | 3/1993 | Katzen et al. |
| 6,699,947 B1 | 3/2004 | Evertz et al. |
| 2008/0051532 A1* | 2/2008 | Mihan ..................... C08F 10/00 526/107 |
| 2008/0269437 A1 | 10/2008 | Mihan et al. |

FOREIGN PATENT DOCUMENTS

| | | |
|---|---|---|
| JP | 06-506259 A | 7/1994 |
| JP | 2008-502760 A | 1/2008 |

OTHER PUBLICATIONS

PCT International Search Report & Written Opinion mailed Dec. 21, 2012, for PCT/EP2012/074303.

* cited by examiner

*Primary Examiner* — Fred M Teskin

(57) ABSTRACT

The instant invention pertains to a process for preparing an ethylene homo- or copolymer in the presence of a supported chromium catalyst by slurry loop polymerization or copolymerization, whereby the resulting polymer powder has an increased powder density, in which the supported chromium catalyst has a chromium content of from 0.01 to 5 wt.-%, based on the element in the finished catalyst, and shows a particle size distribution measured according to ISO 13320-2009 comprising two main fractions one of which having a $d_{50}$ of from 15 to 40 μm and the other having a $d_{50}$ of from 45 to 80 μm said catalyst being further characterized by the fact that less than 10% wt of its catalyst particles has diameter lower than 20 μm.

10 Claims, No Drawings

PROCESS FOR PREPARING OLEFIN POLYMER BY SLURRY LOOP POLYMERIZATION HAVING HIGH POWDER DENSITY

This application is the U.S. National Phase of PCT International Application PCT/EP2012/074303, filed Dec. 4, 2012, claiming benefit of priority to European Patent Application No. 11194421.1, filed Dec. 20, 2011, and claiming benefit of priority under 35 U.S.C. §119(e) of U.S. Provisional Application No. 61/577,992, filed Dec. 20, 2011, the contents of which are incorporated herein by reference in their entirety.

FIELD OF THE INVENTION

The invention relates to a process for preparing an ethylene homo or copolymer in the presence of a supported chromium catalyst by slurry loop polymerization or copolymerization of olefins whereby the resulting polymer powder has an increased powder density.

BACKGROUND OF THE INVENTION

Homopolymers and copolymers of ethylene with higher alpha-olefins such as 1-butene, 1-pentene, 1-hexene or 1-octene may be prepared, for example, by polymerization in the presence of supported chromium compounds, known as Phillips catalysts. U.S. Pat. No. 6,699,947 describes supported chromium catalysts and their preparation, whereby a support material is treated in suspension with a chromium salt solution and subsequently, after removing the solvent, is calcinated in an oxygen-containing atmosphere at temperatures above 300° C. Catalyst having a mean particle size of less than 100 μm is obtained by grinding or comminuting either the support or the catalyst at any stage of preparation.

Suspension polymerization processes have been known for a long time already. A process in which the polymerization is carried out in a loop reactor is described in WO2005/028098 and is particularly useful for the polymerization of ethylene and of ethylene together with other olefinic comonomers. In loop reactors, the polymerization mix is pumped continuously through the cyclic reactor tube. Such circulation of the polymerization mix helps to approach an optimum homogeneization of the reaction mix, it improves the catalyst distribution and also prevents sedimentation of the suspended polymer.

Also U.S. Pat. No. 6,239,235 describes a polymerization process in a loop reactor, in which an increase in the average proportion of solids of up to 53% wt in the reactor is achieved by means of a continuous discharge system.

Many ethylene polymers and co-polymers are sold commercially as powder grades. For efficient logistics and increased line speed during the processing of such powder grades, a high bulk density of the products is required to maintain economic conditions in the industrial production.

In WO03/054035 it is described the use of a mixture of two ZN catalysts comprising a titanium and an electron donor compound supported on magnesium chloride, having different average particle size and/or different porosity in order to produce in a loop reactor, propylene polymers having either increased bulk density or, for the same bulk density, increased porosity. Due to the fact that the disclosure is focused on the preparation of propylene polymer, it does not address the problem of the generation of fine particles of polymer when producing polymer particles having smaller average size.

In fact, it is well known that smaller catalyst particles produce smaller polymer particles with higher bulk density. However, such products show unfortunately a totally unacceptable high amount of fines, whereby more than 1.5% of the particles have a particle diameter of less than 125 μm. Particularly in ethylene polymerization, such high amount of fines implicates the risk of dust explosions due to electrostatic charging and/or conveying problems and, thus, is the reason for big technical problems during processing. As smaller polymer particles are, as more they tend to electrostatic charging. Such charged particles increase the risk of operability problems during polymerization by wall sheeting and reactor fouling, as may be recognized as increased power input of the reactor pump.

SUMMARY OF THE INVENTION

One object of the instant invention is a process for the preparation of ethylene polymers in which the polymer powder density is increased while maintaining a satisfactory low fine content and simultaneously to increase the reactor density (solid content) and ethylene throughput without causing reactor fouling.

The afore-mentioned object is surprisingly achieved according to the instant invention by a process as mentioned initially, wherein a supported chromium containing polymerization catalyst is used having a chromium content of from 0.01 to 5 wt %, based on the element in the finished catalyst and shows a particle size distribution measured according to ISO 13320-2009 comprising two main fractions one of which having a $d_{50}$ of from 15 to 40 μm and the other having a $d_{50}$ of from 45 to 80 μm and a total $d_{10}$ value of lower than 20 μm.

DETAILED DESCRIPTION OF THE INVENTION

The chromium catalyst is preferably prepared by the following steps:

(a) preparing a homogeneous solution comprising an organic or inorganic chromium compound in a protic or aprotic polar solvent, (b) bringing the solution from a) into contact with spray dried silica material, (c) removing the solvent from the solid and (d) calcining the solid at temperatures of from 350 to 1050° C., preferably from 400 to 950° C., under oxidative conditions. Said process being characterized by the fact that at least in one of the step (b) to (d) the solid comprises a combination of two main solid fractions, one having a $d_{50}$ of from 15 to 40 μm and the other having a $d_{50}$ of from 45 to 80 μm.

Preferably, step b) is carried out with the single fractions of spray dried silica support materials. The resulting products of the step (b) performed with single fractions are subject to step (c) separately and the catalyst fractions are combined prior to step (d) where a combination of two spray dried silica support materials the first having a $d_{50}$ of from 15 to 40 μm and the second having a $d_{50}$ of from 45 to 80 μm can be used.

Alternatively the resulting products of the step (b) performed with single fractions may then be combined and subject to step (c) and (d), or the combination may be made prior to step (b). In a further alternative procedure, the catalyst fractions are subject to step (d) first and then combined before use in polymerization.

However, it constitutes a preferred embodiment combining the different fractions after completion of step (c) and before beginning step (d).

The above mentioned catalysts have a high activity and productivity even at low activation temperatures and produce high molecular weight polymers even at high calcination temperatures. The polymers have, in particular, a high powder density of 500 g/L or higher and a high intrinsic viscosity of 1 dL/g or higher.

Preferably, the chromium catalyst of the present invention comprises the chromium compounds supported on a support composed of two spray dried silica materials, the first having a $d_{50}$ of 20 to 30 μm and the second having a $d_{50}$ of 45 to 60 μm, so as that if a 1:1 mixture of both is made has a $d_{50}$ of 30 to 40 μm. Preferably, the two catalyst fractions have a narrow particle size distribution (PSD). The breath of the PDS can be calculated according to the formula $$\frac{P90 - P10}{P50},$$

wherein P90 is the value of the diameter such that 90% of the total particles have a diameter lower than that value; P10 is the value of the diameter such that 10% of the total particles have a diameter lower than that value and P50 is the value of the diameter such that 50% of the total particles have a diameter lower than that value. For the purpose of the present invention, it would be preferable that both the catalyst fractions have a PSD calculated with the above formula lower than 1.8 and preferably lower than 1.2. Still more preferably, the $d_{10}$ value referred to the total fractions of the catalyst particles is lower than 15 μm.

Due to the bimodal particle size distribution of the catalyst and to its tailored particle size, it was surprisingly possible to increase the powder density of up to 520 g/l and higher, whereby the amount of fine polymer particles, having a diameter of 125 μm or less, is still very low and does not exceed 1.5 wt %, calculated on total weight of the polymer powder, and it is preferably less than 1.4 wt %.

In principle, it is possible to use all chromium compounds and compounds of the abovementioned elements which are sufficiently soluble in the solvent chosen to form a homogeneous solution and are inert toward the solvent.

Preference is given to using chromium compounds having a valence of less than six, particularly preferably Cr(III) compounds. Compounds of this type include, for example, chromium hydroxide and soluble salts of trivalent chromium with an organic or inorganic acid, e.g. acetates, oxalates, sulfates or nitrates. Particular preference is given to salts of acids which during activation are converted essentially into chromium(VI) without leaving a residue, e.g. chromium(III) nitrate nonahydrate. Furthermore, chelate compounds of chromium, e.g. chromium derivatives of β-diketones, β-ketoaldehydes or β-dialdehydes, and/or complexes of chromium, e.g. chromium(III) acetylacetonate or chromium hexacarbonyl, or organometallic compounds of chromium, e.g. bis(cyclopentadienyl)chromium(II), organic chromic (VI) esters or bis(arene)chromium(0), can likewise be used.

It is also possible to use secondary dopants which include all organic or inorganic compounds of elements selected from among Mg, Ca, Sr, B, Al, Si, P, Bi, Sc, V, Mn, Fe, Co, Ni, Cu, Zn, Zr, Ti Nb, Mo, Ru, Rh, Pd, Hf, Ta, W which are readily soluble in the polar solvent chosen. From these special preference is given to Zr. The compounds also include chelates of the elements.

Preference for secondary dopants is given to using zirconium compounds of the general formula $Zr(OR)_nX_{4-n}$, where R is preferably a hydrocarbon compound which has from 1 to 20 carbon atoms, is preferably selected from the group consisting of substituted or unsubstituted alkyl groups such as methyl, ethyl, n-propyl, n-butyl, tert-butyl, n-pentyl, n-hexyl, n-heptyl, n-octyl, vinyl, allyl, benzyl, phenyl; X is preferably a halogen atom, a carboalkoxy group, a carboxyl group, an acyl alkenate or a hydrocarbon compound having from 1 to 20 carbon atoms and n is an integer from 0 to 4. Preferred zirconium compounds are selected from the group consisting of $ZrCl_4$, $ZrO(NO_3)_2$, $ZrOSO_4$, $ZrOCl_2$, $Zr(OR)_4$, zirconium acetate, zirconium ethylhexanoate, zirconium pentane dionate and zirconium acetylacetonate. Particular preference is given to zirconium(IV) propoxide.

Suitable solvents include all protic or aprotic polar solvents, with preference being given to organic solvents. Particular preference is given to organic protic solvents. Polar solvents are solvents which have a permanent dipole moment. The solvent is preferably a saturated, unsaturated or aromatic organic liquid.

For the purposes of the present invention, a protic medium is a solvent or solvent mixture which comprises from 1 to 100% by weight, preferably from 50 to 100% by weight and particularly preferably 100% by weight, of a protic solvent or a mixture of protic solvents and from 99 to 0% by weight, preferably from 50 to 0% by weight and particularly preferably 0% by weight, of an aprotic solvent or a mixture of aprotic solvents, in each case based on the protic medium.

Protic solvents are, for example, alcohols $R^1$—OH, amines $NR^1{}_{2-x}H_{x+1}$, $C_1$-$C_5$-carboxylic acids and inorganic aqueous acids such as dilute hydrochloric acid or sulfuric acid, water, aqueous ammonia or mixtures thereof, preferably alcohols $R^1$—OH, where the radicals $R^1$ are each, independently of one another $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^2{}_3$, the radicals $R^2$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part and x is 1 or 2. Possible radicals $R^1$ or $R^2$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4- 2,3,5-, 2,3,6-, 2,4,5-, 2,4,6- or 3,4,5-trimethylphenyl, or aralkyl which may bear further alkyl groups as substituents, e.g. benzyl, o-, m-, p-methylbenzyl, 1- or 2-ethylphenyl, where the two $R^1$ or two $R^2$ may in each case also be joined to form a 5- or 6-membered ring and the organic radicals $R^1$ and $R^2$ may also be substituted by halogens such as fluorine, chlorine or bromine Preferred carboxylic acids are $C_1$-$C_3$-carboxylic acid such as formic acid or acetic acid. Preferred alcohols R1-OH are methanol, ethanol, 1-propanol, 2-propanol, 1-butanol, 2-butanol, 1-pentanol, 2-pentanol, 1-hexanol, 2-ethylhexanol, 2,2-dimethylethanol or 2,2-dimethylpropanol, in particular methanol, ethanol, 1-propanol, 1-butanol, 1-pentanol, 1-hexanol or 2-ethylhexanol. The water content of the protic medium is preferably less than 20% by weight.

Aprotic solvents are, for example, ketones, ethers, esters and nitriles, without being restricted thereto.

After preparation of the homogeneous solution, the active components are applied to a support material comprising (either in single or combined form) spray dried silica materials, wherein the first having a $d_{50}$ of 20 to 30 µm and the second having $d_{50}$ of 48 to 53 µm respectively. Such silica supports with narrow particle size distribution are commercially available, for example they are presently sold by Grace under the commercial name XPO 2485 and XPO 2107 respectively. If a 1:1 mixture of both is prepared a combination is obtained having a $d_{50}$ of 32 to 37 µm. It is also possible to preare such supports of defined particle size by subjecting broader particle size distribution supports to sieving techniques. In order to form the catalyst precursor the solution is brought into contact with the spray dried silica support material as specidied before in a second step (b).

The homogeneous solution comprising the chromium compound and, if appropriate, the compound of the further elements is preferably added to the support, but the support can also be suspended in a solution comprising the appropriate chromium compound and the liquid constituents of the reaction mixture can be evaporated with continuous, preferably homogeneous, mixing.

The application of a chromium compound is preferably carried out from a from 0.05% strength by weight to 15% strength by weight solution of a chromium compound which is converted under the activation conditions into chromium (VI) oxide in a $C_1$-$C_4$-alcohol, with the respective solvent preferably containing not more than 20% by weight of water. Loading of the support without use of solvents, for example by mechanical mixing, is also possible.

The chromium compound is present in a concentration of usually from 0.05 to 20 wt.-%, preferably from 0.1 to 15 wt % and particularly preferably from 0.5 to 10 wt %, based on the polar solvent. The compound of the further element is present, if appropriate, in a concentration of usually from 0.05 to 30 wt %, preferably from 0.1 to 20 wt % and particularly preferably from 0.5 to 15 wt %, based on the protic medium. The molar ratio of chromium compound to the compound of the further element, if any, is usually in the range from 10:1 to 1:10, preferably from 5:1 to 1:7 and particularly preferably from 4:1 to 1:5.

The weight ratio of the chromium compounds and compounds of the further elements to the support during loading is in each case preferably in the range from 0.001:1 to 200:1, more preferably in the range from 0.005:1 to 100:1. The amount of solution used during doping in step (b) is preferably smaller than the pore volume of the support.

Reaction steps a) and b) can be carried out independently of one another at temperatures of from 0 to 150° C. For cost reasons, room temperature is preferred in both cases. To improve the solvent capability, a slightly elevated temperature up to 60° C. may also be preferred. Optimal isolation of one of the reaction products formed in the solution can be carried out according to the invention, but is not preferred.

After application of the chromium compound and the secondary dopant, if any, the catalyst precursor is largely freed of solvent, preferably at temperatures of from 20 to 150° C. and pressures of from 300 mbar to 1 mbar, if this is necessary for the subsequent calcination (optional step c).

This can, if appropriate, be carried out under reduced pressure and/or at elevated temperature. The catalyst precursor obtained in this way may be completely dry or may have a certain residual moisture content. The volatile constituents still present preferably make up not more than 20% by weight, in particular not more than 10% by weight, of the still unactivated chromium-containing catalyst precursor.

The catalyst precursor obtained from reaction step b) or c) can immediately be subjected to step d) or, in alternative, can be calcined beforehand in a further intermediate step in a water-free inert gas atmosphere at temperatures above 300° C. The calcination is preferably carried out under inert gas at temperatures of from 300 to 800° C. in a fluidized bed over a time period of from 10 to 1000 minutes.

The final calcination of the catalyst precursor (step d) is carried out at temperatures of from 350 to 1050° C., preferably from 400 to 950° C. For the purposes of the present invention, calcination is the thermal activation of the catalyst in an oxidating atmosphere, unless something to the contrary is said, with the chromium compound applied being converted completely or partly into the hexavalent state, i.e. is activated, if the chromium is not already present in the hexavalent state. The choice of calcination temperature is determined by the properties of the polymer to be prepared and the activity of the catalyst. The upper limit is imposed by the sintering of the support and the lower limit is imposed by the activity of the catalyst coming too low. Calcination is preferably carried out at least at 20 to 100° C. below the sintering temperature. The influence of the calcination conditions on the catalyst are known in principle and are described, for example, in Advances in Catalysis, Vol. 33, page 48 ff. The calcination preferably takes place in an oxygen-containing atmosphere. The intermediate obtained from step b) or c) is preferably activated directly in the fluidized bed by replacement of the inert gas by an oxygen-containing gas and by increasing the temperature to the activation temperature. It is preferably heated at the appropriate calcination temperature in a water-free gas stream comprising more than 10% by volume of oxygen over a time period of from 10 to 1000 minutes, in particular from 150 to 750 minutes, and then cooled to room temperature, resulting in the Phillips catalyst to be used according to the invention. Apart from the oxidative calcination, it is also possible for a calcination under inert gas conditions to be carried out beforehand or afterward.

The activation may be carried out in a fluidized bed and/or in a stationary bed. Preference is given to carrying out a thermal activation in fluidized-bed reactors.

The catalyst precursor may also be doped with fluoride. Doping with fluoride may be carried out during preparation of the support, application of the transition metal compounds (basic doping) or during activation. In a preferred embodiment of the preparation of the supported catalyst, a fluorinating agent is brought into solution together with the desired chromium and zirconium compounds in step (a) and the solution is applied to the support in step (b).

In a further preferred embodiment, doping with fluorine is carried out subsequent to step (b) or (c) during the calcination step (d) of the process of the invention. Fluoride doping is particularly preferably carried out together with the activation at temperatures in the range from 400 to 900° C. in air. A suitable apparatus for this purpose is, for example, a fluidized-bed activator.

Fluorinating agents are preferably selected from the group consisting of $ClF_3$, $BrF_3$, $BrF_5$, $(NH_4)_2SiF_6$ (ammonium hexafluorosilicate, ASF for short), $NH_4BF_4$, $(NH_4)_2AlF_6$, $NH_4HF_2$, $(NH_4)_3PF_6$, $(NH_4)_2TiF_6$ and $(NH_4)_2ZrF_6$. Preference is given to using fluorinating agents selected from the group consisting of $(NH_4)_2SiF_6$, $NH_4BF_4$, $(NH_4)_2AlF_6$, $NH_4HF_2$, $(NH_4)_3PF_6$. Particular preference is given to using $(NH_4)_2SiF_6$.

The fluorinating agent is generally used in an amount in the range from 0.3% by weight to 10% by weight, preferably in the range from 0.5% by weight to 8% by weight, particularly preferably in the range from 0.5% by weight to 5% by weight, very particularly preferably in the range from 0.5% by weight to 3% by weight, based on the total mass of the catalyst used. Preference is given to using from 1% by weight to 2.5% by weight, based on the total mass of the catalyst used. The properties of the polymers prepared can be varied as a function of the amount of fluoride in the catalyst.

Fluorination of the catalyst system can advantageously lead to a narrower molar mass distribution of the polymers obtainable by a polymerization than is the case in a polymerization by means of a nonfluorinated catalyst.

After the calcination, the calcined catalyst can, if appropriate, be reduced, for example by means of reducing gases such as CO or hydrogen, preferably at from 350 to 950° C., to obtain the actual catalytically active species. However, the reduction can also be carried out only during the polymerization by means of reducing agents present in the reactor, e.g. ethylene, metal alkyls and the like.

The drying of the slurry comprising the finely particulate hydrogel to give the support is carried out by spray drying. However, the spray-dried support particles can additionally be dried thermally.

The conditions of spray drying can be varied within a wide range. The properties of the support particles after spray drying are largely determined by the properties of the slurry according to known principles, so that the individual spray-drying parameters are largely noncritical for the properties of the support. The setting of the spray-drying parameters to achieve the desired properties of the support particles, e.g. temperature, amount of gas, gas entry and exit temperature and/or initial and final moisture content, are known to those skilled in the art and are selected according to the properties of the apparatus.

The support particles which are produced by means of spray drying generally have a spheroidal, i.e. sphere-like, shape. The desired mean particle size of the supports after spray drying are adjusted according to known techniques such as sieving to result in the bimodal particle size distrubution as specified herein-before.

The support particles prepared by this process have a pore volume which is preferably in the range below 2 ml/g, more preferably in the range from 1.8 ml/g to 1.25 ml/g.

The support particles prepared have a pore diameter which is preferably in the range below 200 Å, more preferably in the range below 150 Å, particularly preferably in the range from 50 Å to 130 Å.

The surface area of the inorganic support can likewise be varied within a wide range by means of the drying process, in particular the spray drying process. Preference is given to producing particles of the inorganic support, in particular a product from a spray dryer, which have a surface area in the range from 100 m$^2$/g to 1000 m$^2$/g, preferably in the range from 150 m$^2$/g to 700 m$^2$/g and particularly preferably in the range from 200 m$^2$/g to 500 m$^2$/g. Supports which can be used for polymerization preferably have a surface area in the range from 200 m$^2$/g to 500 m$^2$/g. The specific surface area of the support particles is the surface area of the particles determined by means of nitrogen adsorption in accordance with the BET technique.

The apparent density of the inorganic supports for catalysts is preferably in the range from 250 g/l to 1200 g/l, with the apparent density being able to vary as a function of the water content of the support. The apparent density of water-containing support particles is preferably in the range from 500 g/l to 1000 g/l, more preferably in the range from 600 g/l to 950 g/l and particularly preferably in the range from 650 g/l to 900 g/l. In the case of supports which contain very little if any water, the apparent density is preferably from 250 g/l to 600 g/l.

The support used according to the invention is prepared on the basis of a silica hydrogel. The support therefore preferably comprises a high proportion of $SiO_2$. Preference is given to the silicon content of the support being in the range≥10% by weight, preferably in the range≥15% by weight, more preferably in the range≥20% by weight, particularly preferably in the range≥25% by weight, more particularly preferably in the range≥30% by weight, especially in the range≥40% by weight, very particularly preferably in the range≥50% by weight, based on the total weight of the support.

The support material can also be partially or fully modified before use in the process of the invention. The support material can, for example, be treated under oxidizing or nonoxidizing conditions at temperatures of from 200 to 1000° C., if appropriate in the presence of fluorinating agents such as ammonium hexafluorosilicate. In this way, it is possible, inter alia, to vary the water content and/or OH group content. The support material is preferably dried at from 100 to 200° C. under reduced pressure for from 1 to 10 hours before being used in the process of the invention.

The supported catalysts according to the invention may be used, in particular, for the polymerization and/or copolymerization of ethylene alone or together with other olefins. The present invention therefore provides a process for preparing an ethylene polymer by polymerization of ethylene and, if appropriate, $C_3$-$C_{20}$-olefins as comonomers in the presence of the supported polymerization catalyst prepared according to the invention.

The catalyst systems which are prepared according to the invention are used in the known catalytic polymerization processes such as suspension polymerization process. Suitable reactors are, for example, continuously operated loop reactors. Of course, the reaction can also be carried out in a plurality of reactors, connected in series. The reaction time depends critically on the reaction conditions selected in each case. It is usually in the range from 0.2 hour to 20 hours, mostly in the range from 0.5 hour to 10 hours. Advantageous pressure and temperature ranges for the polymerization reactions can vary within wide ranges and are preferably in the range from −20° C. to 300° C. and/or in the range from 1 bar to 100 bar, depending on the polymerization method.

Antistatics can optionally be added to the polymerization. Preferred antistatics are, for example, ZnO and/or MgO, with these antistatics preferably being able to be used in amounts ranging from 0.1% by weight to 5% by weight, based on the total amount of the catalyst mixture. The water content of ZnO or MgO is preferably less than 0.5% by weight, more preferably less than 0.3% by weight, based on the respective total mass. Examples of commercial products which can be used are Statsafe 3000, Statsafe 6000 both obtainable from Innospec or Kerostat 8190 obtainable from BASF. Antistatics which can be used are, for example, known from EP 229368, U.S. Pat. No. 5,026,795, US2010072427, WO2008107371 and U.S. Pat. No. 4,182,810.

In a polymerization and/or copolymerization using the supported catalysts which can be prepared according to the invention, the output of polymer having a particle size in the range from >0 µm to ≤125 µm is, in particular embodiments, advantageously in the range below 1.5 wt.-%, based on the total powder output.

The very low fine dust outputs which can be achieved in polymerization processes using the supports which can be prepared by the process of the invention are a particular advantage of the present invention. A low output of fine polymer dust can lead to a polymerization product having improved properties, for example an improved film grade and/or a lower frequency of specks in the polymer films. A lower output of fine polymer dust can also lead to significantly better manageability of the polymerization process. A lower output of fine polymer dust can advantageously lead to prevention of or at least a significant reduction in the formation of lumps, deposits on walls and agglomerates in the reactor which, particularly in gas-phase processes, block the output lines and can lead to shutdown and cleaning of the plant.

The supported catalyst systems which can be prepared according to the invention also make it possible to produce, in particularly preferred embodiments using the supported catalyst systems which can be prepared according to the invention, polymers and/or copolymers, in particular ones which can be prepared from 1-alkene, having a high poured density and small proportions of fine and/or very fine material.

As a result of the use of the catalysts prepared by the process of the invention, it is possible and preferred to produce a polymer powder having a powder density of 500 g/l and more, preferably 520 g/l and more, in a suspension loop polymerization reactor.

A further great advantage of particularly preferred embodiments of the process of the invention for preparing catalysts is a surprisingly high activity and productivity of the supported catalysts in the polymerization and copolymerization of olefins.

In preferred embodiments, the productivity of the catalysts supported on these supports in the polymerization and/or copolymerization of olefins is in the range from 500 g of polymer per g of catalyst to 9000 g of polymer per g of catalyst, in more preferred embodiments in the range from 1000 to 9000 g of polymer per g of catalyst, in especially preferred embodiments in the range from 4000 to 9000 g of polymer per g of catalyst and in particularly preferred embodiments in the range from 5000 to 9000 g of polymer per g of catalyst.

The catalysts used in the present invention make it possible to produce ethylene polymers having a mean molar mass of above 30,000, preferably above 40,000, particularly preferably above 50,000, with a productivity of above 5000 g of polymer per g of catalyst. The polydispersity $M_w/M_n$ of the polymers is from 13 to 30, preferably from 13 to 25, particularly preferably from 13 to 22.

Owing to their good mechanical properties, the polymers and copolymers of olefins which are prepared using supported catalysts which can be prepared according to the invention are particularly suitable for the production of films, fibers and moldings comprising polymers of olefins according to the present invention as significant or exclusive components.

EXAMPLES

The physical parameters of the catalyst or polymers were determined by the following methods:

Density ISO 1183

Intrinsic viscosity η: ISO 1628 at 130° C. and a concentration of 0.001 g/ml in decalin.

Izod impact toughness: ISO 180/A

Molar masses $M_w$, $M_n$, $M_w/M_n$, high-temperature gel permeation chromatography using a method based on DIN 55672 using 1,2,4-trichlorobenzene as solvent, a flow of 1 ml/min at 140° C. Calibration was carried out using PE standards on a Waters 150C.

Surface area, pore volume: nitrogen adsorption using the BET technique (S. Brunnauer et al., J of Am. Chem. Soc. 60, pp. 209-319, 1929).

Powder density: DIN 53468, measured on the polymer powder.

$MFR_2$, $MFR_{21}$ Melt flow rate in accordance with ISO 1133 at a temperature of 190° C. and under a load of 2.16 or 21.6 kg.

Sieve analysis (Polymer): DIN 53477

Particle size distribution (Catalyst, support material): ISO 13320-2009 together with ISO 9276-1, 9276-2, 9276-4 ISO 14887 and 14488

Ash content: Determined by weighting the ashes after polymer incineration took place in a microwave combustion furnace at 800° C. for 10 minutes Example 1

(1) Preparation of the Catalyst 3 kg of spray dried silica A (Grace XPO 2107) having a mean particle size of 55 µm was placed in a double-cone dryer. 240 g of $Cr(NO_3)_3$ $9H_2O$ were dissolved in 2.5 l of 1-propanol with stirring in a 10 l stirred glass vessel. 314 g of Zr(IV) propoxide (as 70% strength colorless solution in n-propanol) were then added, with the previously deep blue solution suddenly becoming deep green. The solution was slowly pumped into the double-cone dryer. The stirred glass vessel was rinsed with 0.5 l of n-propanol and the suspension was mixed at 8 rpm for 1 hour. After the mixing time, the catalyst precursor was dried for 8 hours under reduced pressure at an external temperature of 120° C.

(2) Activation

The activation of the catalyst precursor from step (1) was carried out at from 520 to 850° C. 2.5% by weight of ammonium hexafluorosilicate (ASF), based on the total mass of the catalyst precursor, were added in powder form. For the activation, the catalyst precursor was heated to the desired activation temperature, held at this temperature for 5 hours and subsequently cooled, with cooling below a temperature of 350° C. being carried out under nitrogen. The precise conditions are shown in Table 1.

(3) Polymerization

The polymerizations were carried out as suspension processes in isobutane in a 50 m³ PF loop reactor. The melt flow rate (MFR) and the density were set via the hexene concentration or ethene concentration. Polymerization was carried out at reactor temperatures of from 99° C. to 107° C. The reactor pressure was 4.5 MPa.

The polymerization conditions are summarized in Table 1.

Example 2

(1) Preparation of the Catalyst

The application to the support was carried out as in Example 1, but using instead of silica A (Grace XPO 2107) a spray dried silica B (Grace XPO 2485) having a mean particle diameter of 25 µm.

(2) Activation

The activation was carried out by a method analogous to Example 1. The precise conditions are shown in Table 1.

(3) Polymerization

The polymerization was carried out as in Example 1. The precise conditions are shown in Table 1.

Example 3

The catalyst of example 1 (after step (1)) was combined with the catalyst of example 2 (after step 1)) in an amount of 1:1. The total d10 value was 10.95 µm.
b) Activation
The activation was carried out by a method analogous to Example 1. The precise conditions are shown in Table 1.
c) Polymerization
The polymerization was carried out as in Example 1 and 2. The precise conditions are shown in Table 1.

Comparative Example C4 a) Preparation of the Catalyst

The application to the support was carried out as in Example 1, but using instead of silica A (Grace XPO 2107) a spray dried silica C (Sylopol XPO2408) having a mean particle diameter of 35 µm.

b) Activation

The activation was carried out by a method analogous to Example 1. The precise conditions are shown in Table 1.

c) Polymerization

The polymerization was carried out as in Example 1. The precise conditions are shown in Table 1.

TABLE 1

| | Polymerization conditions | | | |
|---|---|---|---|---|
| Example No. | 1 | 2 | 3 | C4 |
| Reactor Temperature [° C.] | 106.4 | 106.3 | 106.4 | 106.4 |
| Ethene [% by volume] | 13.0 | 13.0 | 12.9 | 13.1 |
| Hexene [% by volume] | 0 | 0 | 0 | 0 |
| Output [kg/h] | 6100 | 5500 | 7000 | 5400 |
| Ash content [ppm] | 220 | 150 | 160 | 190 |
| MFR$_{21}$ [g/10 min] | 3.12 | 3.1 | 3.12 | 3.15 |
| Density [kg/m$^3$] | 955.0 | 955.0 | 954.9 | 954.8 |
| Powder density [g/l] | 480 | 570 | 545 | 505 |

TABLE 1-continued

| | Polymerization conditions | | | |
|---|---|---|---|---|
| Example No. | 1 | 2 | 3 | C4 |
| Support | Silica A | Silica B | Silica A plus Silica B (1:1) | Silica C |
| Cr content [% by wt] | 1 | 1 | 1 | 1 |
| Zr content [% by wt] | 2 | 2 | 2 | 2 |
| Fine content [%] (<125 µm) | 0.5 | 10.8 | 0.62 | 5.4 |
| Activation temp. [° C.] | 640 | 640 | 640 | 640 |

Looking to the results it becomes apparent that only example 3 produces polymer powder having a high powder density in combination with a low fine content. Example 2 produces polymer having a high powder density, but in combination therewith an unsatisfactory high fine content, whereas comparative example C4 produces polymer having a low powder density and in combination therewith also an unsatisfactory high fine content.

What is claimed is:

1. A process for preparing an ethylene homo- or copolymer in the presence of a supported chromium catalyst by slurry loop polymerization or copolymerization, whereby the resulting polymer powder has a powder density of ≥500 g/L, in which the supported chromium catalyst has a chromium content of from 0.01 to 5 wt. %, based on the element in the finished catalyst, and shows a particle size distribution measured according to ISO 13320-2009 comprising two main fractions one of which having a d$_{50}$ of from 15 to 40 µm and the other having a d$_{50}$ of from 45 to 80 µm and a total d$_{10}$ value of lower than 20 µm.

2. A process according to claim 1 in which the total d10 value is lower than 15 µm.

3. A process according to claim 1 in which one of the two main fractions has a d$_{50}$ of from 20 to 30 µm and the other having a d$_{50}$ of from 30 to 40 µm.

4. A process according to claim 1 in which the supported catalyst is prepared by the following steps:
  (a) preparing a homogeneous solution comprising an organic or inorganic chromium compound in a protic or aprotic polar solvent,
  (b) bringing the solution from a) into contact with spray dried silica material,
  (c) removing the solvent from the solid and
  (d) calcining the solid at temperatures of from 350 to 1050° C., under oxidative conditions, said process being characterized by the fact that in at least one of the steps (b)-(d) the solid comprises a combination of two main fractions, one having a d$_{50}$ of from 15 to 40 µm and the other having a d$_{50}$ of from 45 to 80 µm.

5. A process according to claim 4, in which the combination is made prior to step (d) where a combination of two spray dried silica support materials the first having a d$_{50}$ of from 15 to 40 µm and the second having a d$_{50}$ of from 45 to 80 µm is prepared.

6. The process according to claim 1, wherein the polymerization in the presence of the catalyst is run in a loop reactor under a pressure of less than 100 bars.

7. The process according to claim 1, wherein the polymerization in the presence of the catalyst is run in a loop reactor in which the polymer is continuously discharged.

8. The process according to claim 1, wherein the polymer has a high bulk density of ≥500 g/l with a level of fines (<125 μm) being below 1.5 wt. %.

9. The process according to claim 4, wherein chromium compounds used are salts of trivalent chromium with an organic or inorganic acid.

10. The process according to claim 4, wherein a further compound used is a compound of Zr.

* * * * *

UNITED STATES PATENT AND TRADEMARK OFFICE
CERTIFICATE OF CORRECTION

| | |
|---|---|
| PATENT NO. | : 9,464,147 B2 |
| APPLICATION NO. | : 14/364977 |
| DATED | : October 11, 2016 |
| INVENTOR(S) | : Lars Kölling et al. |

Page 1 of 1

It is certified that error appears in the above-identified patent and that said Letters Patent is hereby corrected as shown below:

On the Title Page

| | | |
|---|---|---|
| Column 1, (30) | Line 1 | Delete "11194421" and insert --11194421.1-- |

In the Specification

| | | |
|---|---|---|
| Column 1 | Line 48 | Delete "homogeneization" and insert --homogenization-- |
| Column 2 | Line 49 | Delete "350 to 1050° C.," and insert --350 °C. to 1050 °C.,-- |
| Column 2 | Line 50 | Delete "400 to 950° C.," and insert --400 °C. to 950 °C.,-- |
| Column 2 | Line 51 | After "conditions.", insert --¶-- |
| Column 4 | Line 65 | After "bromine", insert --.-- |
| Column 4 | Line 67 | Delete "R1-OH" and insert --$R^1$-OH-- |
| Column 5 | Line 57 | Delete "0 to 150° C." and insert --0 °C. to 150 °C.-- |
| Column 5 | Line 65 | Delete "20 to 150° C." and insert --20 °C. to 150 °C.-- |
| Column 6 | Line 13 | Delete "300 to 800° C." and insert --300 °C. to 800 °C.-- |
| Column 6 | Line 16 | Delete "350 to 1050° C.," and insert --350 °C. to 1050 °C.,-- |
| Column 6 | Line 17 | Delete "400 to 950° C." and insert --400 °C. to 950 °C.-- |
| Column 6 | Line 28 | Delete "20 to 100° C." and insert --20 °C. to 100 °C.-- |
| Column 6 | Line 61 | Delete "400 to 900° C." and insert --400 °C. to 900 °C.-- |
| Column 7 | Line 22 | Delete "350 to 950° C.," and insert --350 °C. to 950 °C.,-- |
| Column 8 | Line 26 | Delete "200 to 1000° C.," and insert --200 °C. to 1000 °C.,-- |
| Column 8 | Line 31 | Delete "100 to 200° C." and insert --100 °C. to 200 °C.-- |
| Column 10 | Line 50 | Delete "520 to 850° C." and insert --520 °C. to 850 °C.-- |
| Column 11 | Line 26 | Delete "d10" and insert --$d_{10}$-- |

In the Claims

| | | |
|---|---|---|
| Column 12 | Line 38 | In Claim 2, delete "d10" and insert --$d_{10}$-- |
| Column 12 | Line 51 | In Claim 4, delete "350 to 1050° C.," and insert --350 °C. to 1050 °C.,-- |

Signed and Sealed this
Twenty-second Day of January, 2019

Andrei Iancu
*Director of the United States Patent and Trademark Office*